July 23, 1935. K. M. RONAN 2,008,836
AIRPLANE FUSELAGE CONSTRUCTION
Filed Oct. 27, 1933 2 Sheets-Sheet 1

Inventor:
Kenneth M. Ronan,
By: Arthur McNelson
Atty.

July 23, 1935.　　　K. M. RONAN　　　2,008,836
AIRPLANE FUSELAGE CONSTRUCTION
Filed Oct. 27, 1933　　　2 Sheets-Sheet 2
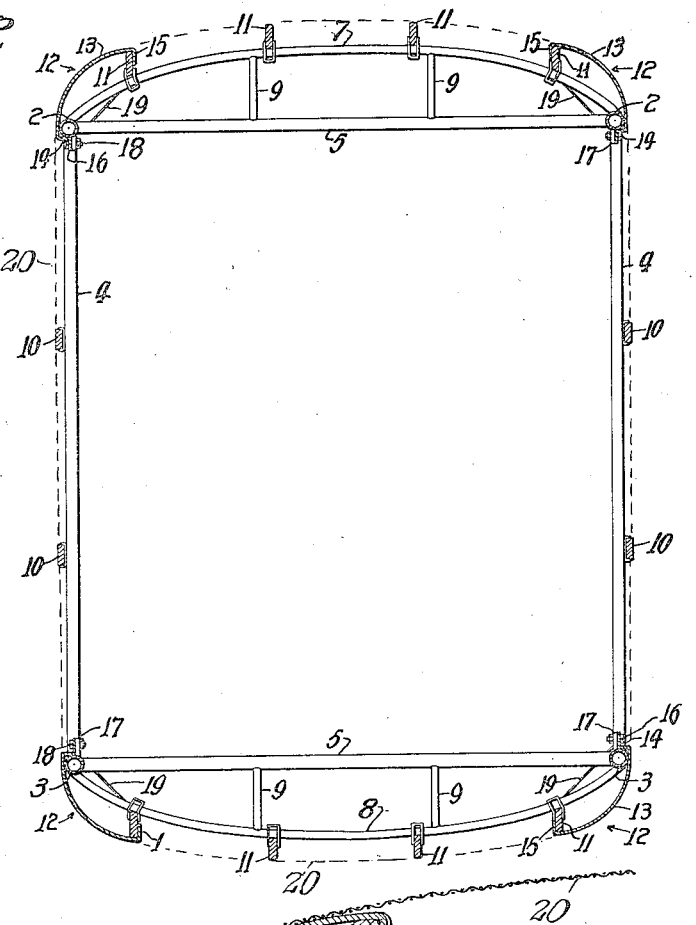
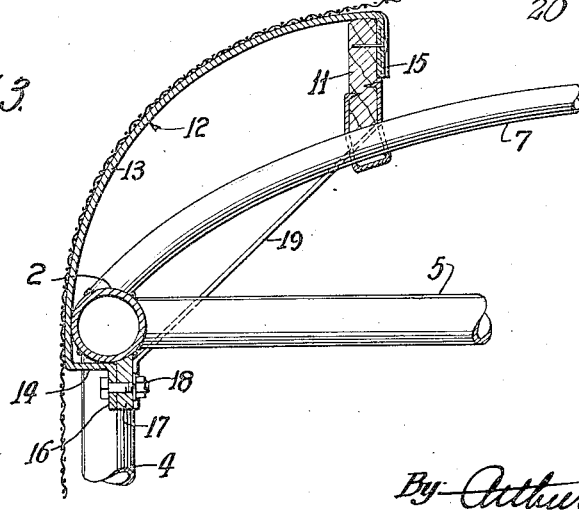
Inventor:
Kenneth M. Ronan,
By Arthur W. Wilson
Atty.

Patented July 23, 1935

2,008,836

UNITED STATES PATENT OFFICE 2,008,836

AIRPLANE FUSELAGE CONSTRUCTION

Kenneth M. Ronan, Wayne, Mich., assignor to Manning & Co., Chicago, Ill., a corporation of Illinois Application October 27, 1933, Serial No. 695,387

6 Claims. (Cl. 244—30)

This invention relates to improvements in airplane fuselage construction, and it consists of the matters hereinafter described and more particularly pointed out in the appended claims.

An airplane fuselage generally includes a suitable frame of relatively small light weight tubing and fairings suitably braced for strength and covered with a fabric. Such a frame is substantially rectanguar in cross section with the longérons at the four corners of the frame. As the longéron tubing is of relatively small diameter, it is a somewhat difficult matter to provide a suitable corner construction which will there support the fabric so that smooth rounded corners of a diameter greater than that of the longéron tubing is afforded.

The primary object of the invention is to provide a corner construction for the fuselage wherein the enclosing fabric is supported by and follows about a larger curved surface than that provided by the longéron tubing whereby a smooth unwrinkled fabric supporting surface is obtainable at the corners of the fuselage.

A further object of the invention is to provide a construction of this kind which though light in weight, is strong and rigid and cooperates with the other parts of the fuselage in increasing the strength of the same as a whole without unduly increasing the weight thereof.

The above mentioned objects of the invention as well as others, together with the many advantages therof, will more fully appear as I proceed with my specification.

In the drawings:—

Fig. 2 is a transverse vertical sectional view through the same on a somewhat enlarged scale as taken on the line 2—2 of Fig. 1.

Fig. 3 is a detail view on an enlarged scale of the parts shown in the upper left hand corner of Fig. 2.

Figure 1:
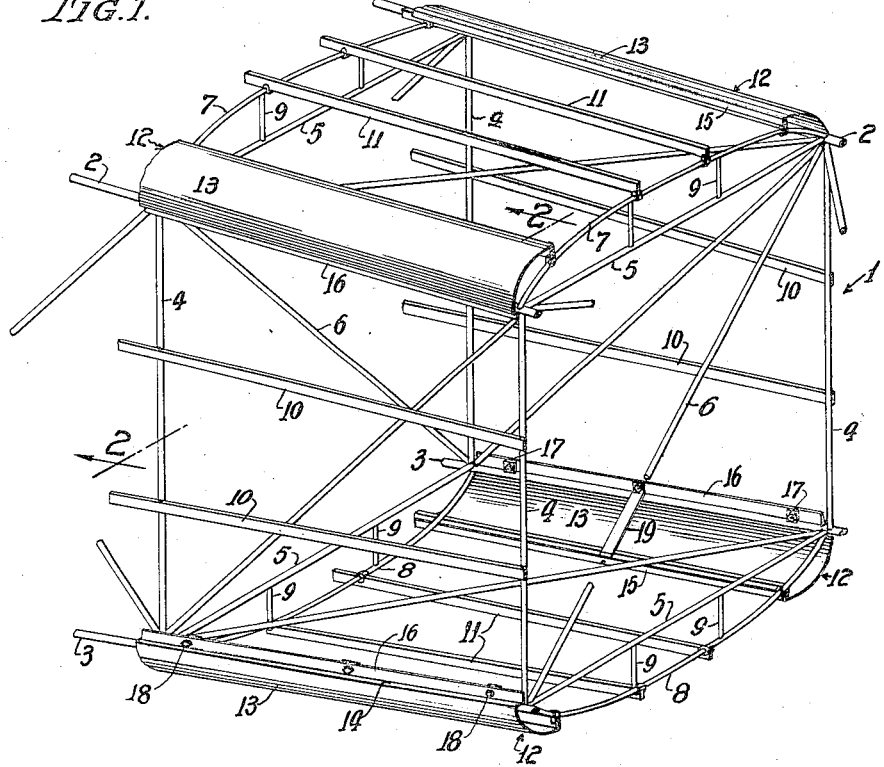
Fig. 1 is a perspective view of a portion of the frame of an airplane fuselage embodying my improved construction, the usual covering fabric having been omitted to more clearly illustrate said construction.

In general, my improved construction includes a round corner providing member which is of about 90° in arcuate length and is formed along one margin for attachment to an associated longéron and is formed along its other margin for attachment to an adjacent fairing strip along the top and bottom of the fuselage. This round corner providing member which has a radius much greater than that of the associated longéron, may be made of any suitable material that may be formed to proper cross sectional shape and which though light in weight is strong and rigid. Sheet metal of certain kinds provides a material having many of the characteristics desired and even ply wood may be used. After the corner pieces have been assembled in place in the fuselage, the fabric covering may be applied to the frame work and said corner pieces hold those portions of the fabric engaged thereon smooth, taut and free from wrinkles and in a condition best adapting its engagement with adjacent fairing strips.

Referring now in detail to that embodiment of the invention illustrated in the accompanying drawings: 1 indicates as a whole the framing of a fuselage which includes the pairs of top and bottom longérons 2—3 at the four corners of the fuselage and operatively connected in the desired spaced relation by the upright and transverse struts 4 and 5 and transverse diagonal braces 6 in the manner well-known. Of course, other fore and aft diagonal bracing members are employed in the framing to rigidify the same. The frame parts and bracing mentioned are generally made of light weight metal tubing of relative small cross section. In connection with the frame parts mentioned, longitudinal fairing strips of wood are employed to provide that support for the fabric which gives the desired cross sectional shape to the fuselage as a whole. Generally, such a contour has relatively flat sides and arched or turtle backed top and bottom. Where it is desired that the fuselage have an arched top and bottom, it is provided in the plane of its transverse struts 5 with bows 7 and 8 of tubing which are connected at their ends to the top longérons and bottom longérons respectively, and are braced from the transverse struts by uprights 9. Generally, such bows are of a diameter less than that of the other tubing making up the frame work.

On the outside of the vertical struts 4 connecting the top and bottom longérons together are vertically spaced, longitudinally extending side fairings 10 and on the outside of the top and bottom bows 7 and 8 are laterally spaced top and bottom fairings 11. These fairings are preferably wooden strips set edgewise and secured to the associated vertical and transverse struts in any suitable manner. Generally, thin sheet metal clips are attached to said struts and are arranged to engage opposite side parts of the fairings and are secured thereto in any suitable manner. As the specific manner of providing the attachment between said fairing and struts, forms no particular part of the present invention, it is not necessary to describe or illustrate the same in detail.

To fill out the rounded corner shape to the general cross sectional shape of the fuselage as a whole, I associate with each of the longérons, a corner contour providing member 12 having a radius much greater than that of the longéron. Such a corner contour providing member is preferably preformed before it is assembled in place and has an arcuate cross section of substantially 90° in length and is provided along each margin with a flange which not only adds stiffness thereto but also provides the means for attaching said member in place.

Figure 4:
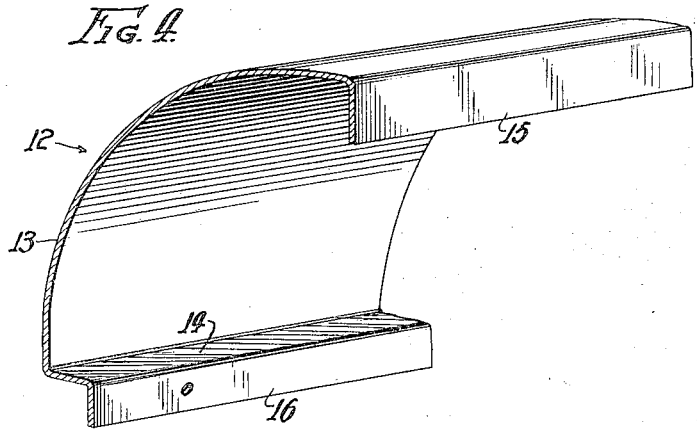
Fig. 4 is a perspective view of a portion of a rounded corner providing member forming a part of my improved construction.

In Fig. 4, I have illustrated a short length of such corner contour providing member 12 made of thin sheet metal of any suitable kind and which includes a transversely curved body 13 of substantially 90° in arcuate length. Each margin of the said body is formed to provide inwardly extending flanges 14 and 15 respectively and one of which includes a flange extension 16 arranged at an angle of about 90° to said one of said flanges.

In assembling said corner contour providing member in place, its flange extension is engaged against and is secured to perpendicularly disposed clips 17 welded to the inner side of the longérons. Preferably said flange extension 16 is secured in place by bolts and nuts 18 but any other means of attachment may be used as is readily apparent.

The flange 15 overhangs the outermost top or bottom fairing strip 11 as best shown in Fig. 3 and may be nailed or screwed thereto. Thus each corner contour providing member partially encloses the longéron and fairing strip mentioned. Preferably but not necessarily so, I may provide corner braces 19 of strip metal, between said flanges and when the same are so provided, one end thereof is fixed to the flange extension 16 and the other end is disposed between the fairing strip 11 and flange 15 and secured thereto by bolts or rivets.

When the corner contour providing members have been assembled and fixed in place, it is apparent that the side portions thereof are substantially flush with the outer surfaces of the side fairing strips 10 and the top and bottom portions thereof are substantially flush with the top and bottom surfaces of the top and bottom fairing strips 11.

A fabric covering 20 is now applied to the fuselage in the usual manner, the same passing about each corner contour providing member and over each fairing and being attached in place in any suitable manner after being drawn taut.

It is apparent that each corner contour providing member enlarges the radius of the corner to give it the desired curvature so that it amply supports the fabric in a taut unwrinkled condition and provides that rounded corner desired in the fuselage. By changing the cross sectional shape of said member, it is possible to provide that shape desired in the corners of the fuselage. The construction described, is light in weight and strong and rigid, and imparts a substantial appearance to the fuselage and supports the fabric covering over a larger area than has heretofore been possible so that it is not so easily torn accidentally or due to the weather elements in flight.

While in describing the invention, I have referred in detail to the form, arrangement and construction of the parts thereof, the same is to be considered as illustrative only, so that I do not wish to be limited thereto except as may be specifically pointed out in the appended claims.

I claim as my invention:—

1. In an airplane fuselage construction, a longéron and a fairing strip adjacent the same, a clip secured to said longéron and a rounded corner contour imparting member, secured at one margin to said fairing strip and at its other margin to said clip secured to said longéron.

2. In an airplane fuselage construction, a longéron and a fairing strip adjacent the same, a clip secured to said longéron and a rounded corner contour imparting member, having a flange along each margin and which flanges are secured to said fairing strip and clip respectively.

3. In an airplane fuselage construction, a longéron and a fairing strip adjacent the same, a clip secured to said longéron and a rounded corner contour imparting member, secured at one margin to said fairing strip and at its other margin to said clip secured to said longéron, and a brace connecting said margins of the corner contour providing member together.

4. In an airplane fuselage construction, a longéron and a fairing strip adjacent the same, a clip secured to said longéron and a rounded corner contour imparting member, having a flange along each margin and which flanges are secured to said fairing strip and clip respectively, and a brace connecting both flanges of said member together.

5. In an airplane fuselage construction, a longéron and a fairing strip adjacent the same, a clip secured to said longéron and a rounded corner contour imparting member, having a flange along each margin and which flanges are secured to said fairing strip and clip respectively, and a brace connecting both flanges of said members together, one end of said brace also being connected to said fairing strip.

6. A corner contour providing member for a fuselage comprising a piece of sheet material of substantially a curved cross section and having a substantially inwardly extending radial flange along each margin and which flanges are arranged at approximately a right angle to each other, one of said flanges having a flange extension disposed substantially parallel with the plane of the other flange.

KENNETH M. RONAN.